United States Patent [19]

Pradin

[11] Patent Number: 5,361,653
[45] Date of Patent: Nov. 8, 1994

[54] STRIPPER FOR ELEMENTS MADE OF ELECTRIC-CONDUCTING MATERIAL AND COVERED WITH A PROTECTIVE OR INSULATING ELEMENT SUCH AS A FILM, A SHEATH OR SIMILAR

[75] Inventor: Louis Pradin, Saint Aubin de Médoc, France

[73] Assignee: Societe Nationale Industrielle et Aerospatiale, Paris, France

[21] Appl. No.: 914,349

[22] Filed: Jul. 17, 1992

[30] Foreign Application Priority Data

Jul. 19, 1991 [FR] France ................................ 91 09398

[51] Int. Cl.$^5$ .............................................. H02G 1/12
[52] U.S. Cl. ...................................................... 81/9.51
[58] Field of Search ................................... 81/9.4, 9.51

[56] References Cited

U.S. PATENT DOCUMENTS

| | | | |
|---|---|---|---|
| 3,071,033 | 1/1963 | Felts .................................. | 82/76 |
| 3,645,156 | 2/1972 | Meyer et al. ........................ | 83/9 |
| 4,745,828 | 5/1988 | Stepan .............................. | 81/9.51 |
| 4,869,135 | 9/1989 | Hoffa ............................... | 81/9.51 |
| 4,999,910 | 3/1991 | Cross ............................... | 29/825 |

FOREIGN PATENT DOCUMENTS

| | | | |
|---|---|---|---|
| 0106108 | 4/1990 | Japan ............................. | 81/9.51 |
| 0211015 | 8/1990 | Japan ............................. | 81/9.51 |

*Primary Examiner*—Roscoe V. Parker
*Attorney, Agent, or Firm*—Roylance, Abrams, Berdo & Goodman

[57] ABSTRACT

An apparatus strips the surface of an element made of an electric-conducting material covered with a protective or insulating element such as a film, a sheath or similar. The apparatus includes a cutting device made of an electric-conducting material, a mechanism for applying and moving the cutting device on the protective and/or insulating element, and a detecting device made of an electric-conducting material. The cutting and detecting devices are placed side-by-side and at short distance from one another, while being electrically insulated from each other and simultaneously moved by the applying and moving mechanism of the devices on the protective and/or insulating element. The detecting device is shaped as a cutting device. A circuit applies a potential difference to the devices and detects a current conduction generated by a micro-contact between the cutting and detecting devices.

20 Claims, 8 Drawing Sheets

FIG_5_

FIG-6

FIG_7_

FIG_8_

FIG_12a_

FIG_12b_

FIG_12c_

FIG_12d_

FIG_12e_

STRIPPER FOR ELEMENTS MADE OF ELECTRIC-CONDUCTING MATERIAL AND COVERED WITH A PROTECTIVE OR INSULATING ELEMENT SUCH AS A FILM, A SHEATH OR SIMILAR

FIELD OF THE INVENTION

The present invention relates to an apparatus for removing a layer, more particularly a protective and/or insulating layer, covering the surface of an element made of an electric-conducting material.

BACKGROUND OF THE INVENTION

The invention applies generally to the stripping of an electric-conducting element or substrate of any shape, covered with a somewhat flat protective and/or insulating element, in order to reach said electric-conducting element or substrate so as it can be connected to other circuits, and applies more specifically to stripping shielded and sheathed cables in the description disclosed herein.

Such cables are made of several conducting wires insulated by means of a lateral sheath. The conducting wires, placed side by side so as to form a bundle, are shielded and covered with a protective and insulating sheath.

In order to use and connect the cables, it is necessary to strip their end portions. This stripping operation involves removing the outer protective sheath on a portion of the cable length so as to expose the end of the shield.

For quality, reliability and safety reasons, it is essential that the shield should not be damaged even superficially during the stripping operation.

The present invention is designed to improve the stripping quality of such cables and more precisely to prevent any contact or deterioration of the shield.

At present, shielded or non-shielded cables are manually stripped (by means of a scalpel, mechanical or thermal nippers) or automatically stripped using mechanical or thermal means.

The implementation of such known techniques does not fully ensure that the wire conductor and/or the shield of the cables has suffered no partial break, contact, cut nor any other deterioration caused by such process, since the process does not include any self-check.

As far as manual stripping is concerned, involving the use of a scalpel for example, cutting depends on the operator's uncheckable skill.

As for mechanical and automatic stripping, for example using rotary knives or shaping knives, cutting depends on the constant adjustment of the depth that has been initially determined by the operator, an adjustment that does not change during the stripping operation and thereby does not take possible variations into account.

As for thermal stripping, metal heating clamping jaws that scorch the insulating cover by successive impressions are used. The result depends on the operator's uncheckable skill like for the scalpel, since the clamping jaws can contact and deteriorate the wire conductor or the shield thereof.

Moreover, temperature cannot be controlled, neither the pressure nor the duration, depending on the variation in thickness and in shape of the insulating means or sheaths to strip. Furthermore, such process emits noxious vapors liable to pollute the atmosphere. Finally, the cutting of the insulating materials is not clear nor sharp because of scorching.

Among automatic methods, the cutting method by means of a laser beam focussed on the area of the insulant to be scorched should be mentioned. Yet, the need to focus the laser beam very precisely onto the area to be cut precludes the use of such methods for stripping outer sheaths since they are not rotationally symetrical as shielded and sheathed cables are. Besides, such method does not guarantee that the parts that are subjacent to the outer sheaths are free from any contact or deterioration.

It is an object of the invention to remedy the disadvantages of the known aforesaid stripping techniques by providing a device that is able to guarantee the stripping of such cables, thanks to a continuous self-check, while preserving the integrity of the exposed shield.

Self-checked cables stripping processes are already known. For example, the U.S. Pat. No. 4,999,910 describes the improvements of a stripping apparatus comprising two diametrically-opposed blades mounted as a clamp and moving simultaneously toward each other, the improvements brought by this patent consisting, briefly, in applying a voltage to the blades and detecting a current transfer between the blades and the core wire of the cable when the blades come near said core wire, such detection bringing the blades to a halt.

However, such method shows serious disadvantages.

It is necessary to apply a high voltage to the blades to obtain a noticeable load. In the example described in the aforesaid U.S. patent, a 300 V voltage is applied to the blades. The process requires taking precautions, and more precisely, to insulate the blades and the driving system so as to prevent the operator from receiving discharges.

Besides, the quality of the electric discharge between the blades and the core wire and more precisely the intensity, directly depends on the initial electric state of the core wire, so that one is never really sure that the blades are stopped soon enough, that is to say that they have not started to cut the outer surface of the core wire.

Finally, the current loads stored on the core wire after stripping should be removed so that the core wire returns to a voltage-neutral condition, which is imperative as emphasized in the description (col. 12, lines 49–57) in order to avoid problems in the electric circuits wherein the stripped cables shall be used and so that the other end of the same cable can be stripped similarly.

It also should be noted that the apparatus described in the U.S. Pat. No. 4,999,910 is inoperative for stripping non-circular outer profile cables because of the cutting methods having two diametrically-opposed blades travelling simultaneously and synchronously.

SUMMARY OF THE INVENTION

The invention disclosed herein provides an electric self-controlled stripping method that is free from the various above-mentioned disadvantages and that permits stripping circular and non-circular outer profile cables such as shielded and sheathed cables in a complete automatic and perfectly reliable manner.

It is therefore an object of the invention to provide an apparatus for stripping the surface of an electric-conducting material element covered with a protective or insulating element such as a film, a sheath or similar, comprising a cutting device made of electric-conducting material, means for applying and moving said cutting device mounted on said protective and/or insulating element, said apparatus further comprising a detecting device made of an electric-conducting material, said cutting and detecting devices being mounted side by side and at close distance from one another whilst being electrically insulated and simultaneously moved by said applying and moving means onto the protective and/or insulating element, the detecting device being shaped as a cutting device, and means for applying a potential difference to said devices and for detecting a current conduction generated by a microcontact between both aforesaid devices.

In this apparatus, the cutting device and the detecting device come into contact with such material and both devices begin to cut in the same area and thereby approach near the surface of the electric-conducting subjacent element under the same condition, the detecting device being shaped so as to make a cut, since it necessarily penetrates into the protective and insulating material together with the cutting device.

As soon as both aforesaid devices approach said subjacent element and is sufficiently close to it to generate an electric microcontact between said electric-conducting element and the detecting device on the one hand, and said electric-conducting element and the cutting device on the other hand, an electric microcurrent is created between both devices and is immediately detected to stop the stripping process preferably automatically and instantaneously.

An effective stripping is obtained thereby with the assurance that the subjacent element is not reached nor damaged.

Moreover, such device allows to cut safely a protective or insulating material whose thickness may vary since the associated cutting and detecting devices move together toward approximately the same point on the subjacent element, thereby allowing to strip shielded and sheathed cables among others. For the purpose of this invention "cutting device" implies any means suited to generate in the whole or part of the covering element thickness an interruption of continuity with or without material removal, such as a cutting means or a melting means.

Advantageously, the means for applying and moving the cutting devices comprise means suited to apply the cutting devices on said covering element with an adjustable predetermined pressure.

According to a main application of the invention, the covering element is a tubular element sheathing a shield that surrounds various wire conductors of any nature and shape, or a conducting core of any shape.

Within the scope of such application, the apparatus of the present invention comprises of a bearing means common to both cutting and detecting devices, a means for holding the cable to be stripped placed approximately in front of the aforesaid devices so as to receive between said bearing and holding means respectively the cable, a frame supporting said means one of which at least being mounted so as to slide toward the other one, means suited to exert a continuous and adjustable pressure on the sliding means, and means suited to rotate by at least one revolution between the cable to be stripped and the supporting and holding means assembly.

Preferably, both cutting and detecting devices are provided with means for limiting the penetration into the covering element of the cable and acting as guides for the relative rotation between the cable and said devices.

Preferably, to realize a continuous self-check of the stripping process, the applying means of said constant adjustable force are connected to the means applying a potential difference to the cutting device and the device for detecting a current conduction between said devices, so as to eliminate or reduce the application of said force when a current conduction caused by microcontact is detected.

With the provision of particularly sensitive means for detecting a current conduction created by microcontact and of means acting particularly rapidly on the means applying said force, in response to said detecting means, it is possible to maintain a very good quality even with a stripping defect detection, namely the detection of a microcontact current conduction between both cutting devices.

Indeed, the device can be completely automated and take into account the various adjusting parameters: depth of cutting, pressure applied by the cutting and detecting devices, rotation speed, number of revolutions for cutting, such parameters being for example initially programmed for each cable shape.

BRIEF DESCRIPTION OF THE DRAWINGS

Other characteristics and advantages of the invention will be better understood upon consideration of the following description of one embodiment of shielded and sheathed cables stripping, such description being given as an example only and referring to the accompanying drawings wherein.

DETAILED DESCRIPTION OF THE INVENTION

Figure 1:
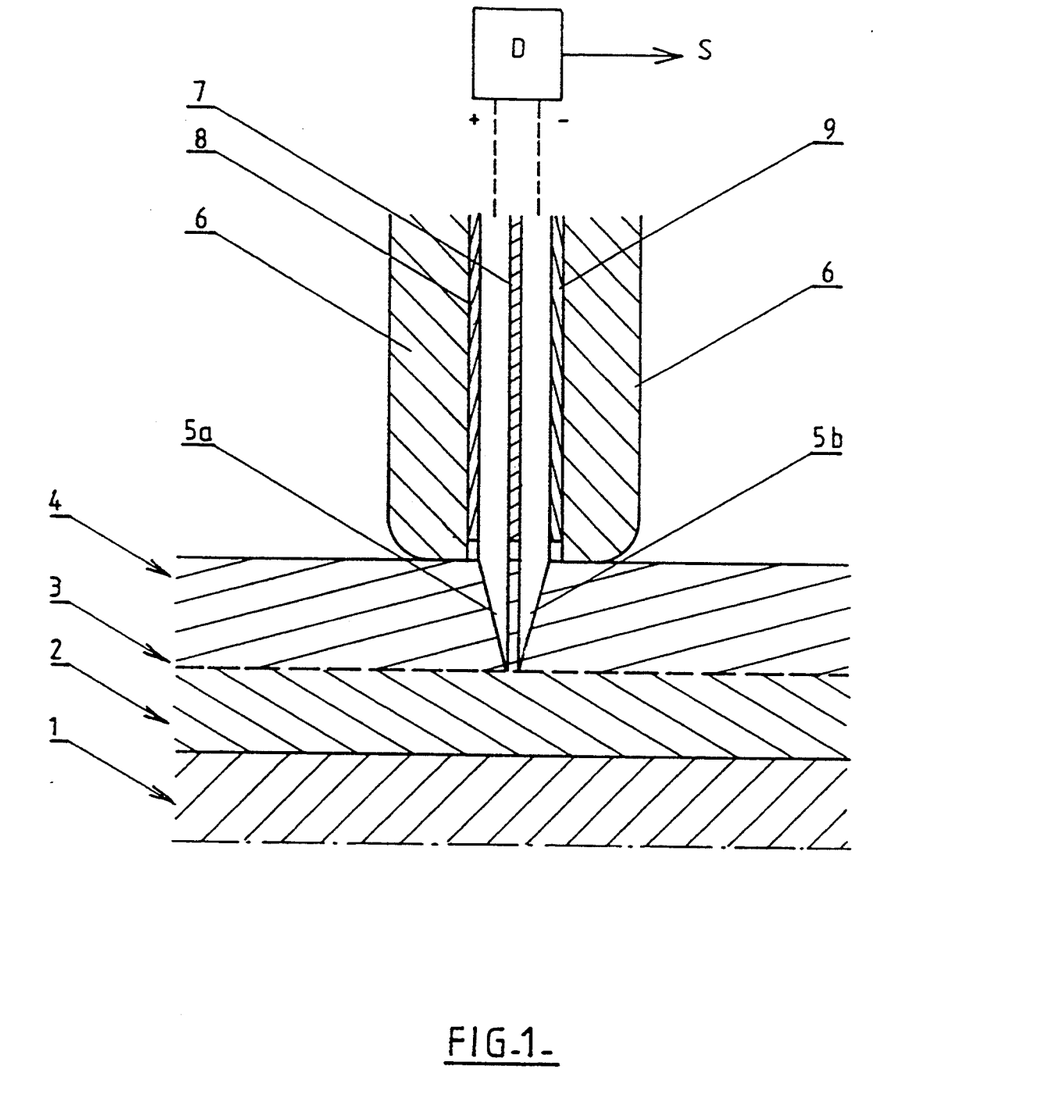
FIG. 1 is a diagram illustrating the cutting of a shielded cable sheath according to the present invention.

Referring to FIG. 1, one-half of a cylindrical cable is illustrated in longitudinal cross section. The cable comprises successively, starting from the center, a unique or multiple core 1, an inner insulating sheath 2, a metal shield 3 and an outer insulating sheath 4.

The shield 3 is for example a tinned copper braiding and the outer insulating sheath 4 is for example made of "Teflon" or "Kapton".

According to the invention, the outer sheath 4 is cut through thanks to an apparatus consisting of a detecting device 5a associated with a cutting device 5b, both devices being placed side by side and at close distance from one another whilst being insulated.

Since devices 5a and 5b are directed toward the sheath 4, the detecting device 5a should necessarily be shaped as a cutting device and be preferably similar to the cutting device 5b designed for stripping.

Thereby, both devices 5a and 5b have similar and parallel cutting edges separated by a constant distance of one tenth of a mm for example. Both devices 5a and 5b are for example thin blades suitably shaped and dimensioned, perpendicular to the axis of the cable when it is in stripping position. The devices are fixed relative to each other during the stripping operation and are simultaneously moved toward the core 1 so as to cut the outer sheath 4 along two parallel cuts.

Both blades 5a and 5b are electrically connected to a detector D of current conduction created by a micro-contact between the blades comprising means for applying an appropriate potential difference to blades 5a and 5b and for generating a signal S in case a micro-contact current conduction should arise between both blades 5a and 5b via the shield 3 or the possible outer oxidation film thereof caused by a cut into the sheath 4 resulting too deep.

Referring again to FIG. 1, there is shown, on each side of the pair of blades 5a and 5b, a detector or sensor 6 from the extremity of which the blades protrude according to a predetermined adjustable length. The detector 6-blades 5a, 5b assembly is moved toward the cable to be stripped, the detector 6 being used as a stop limiting the penetration depth of the blades into the sheath 4 and also acting as a guide, as it will be seen hereinafter, when the detector-blades assembly rotates around the cable according to a trajectory that is perpendicular to the cable axis.

Insulating strips or layers 7 and 8-9 respectively are provided for between blades 5a and 5b, and between the blades 5a-5b and the detector 6. Means for moving the detector 6-blades 5a-5b assembly toward the cable core on the one hand, and around the cable on the other hand will be described hereinafter.

According to a preferred embodiment, signal S is an information signal that also can control the distance between the detector 6-blades 5a, 5b assembly and the cable and stop the stripping operation.

Figure 2:
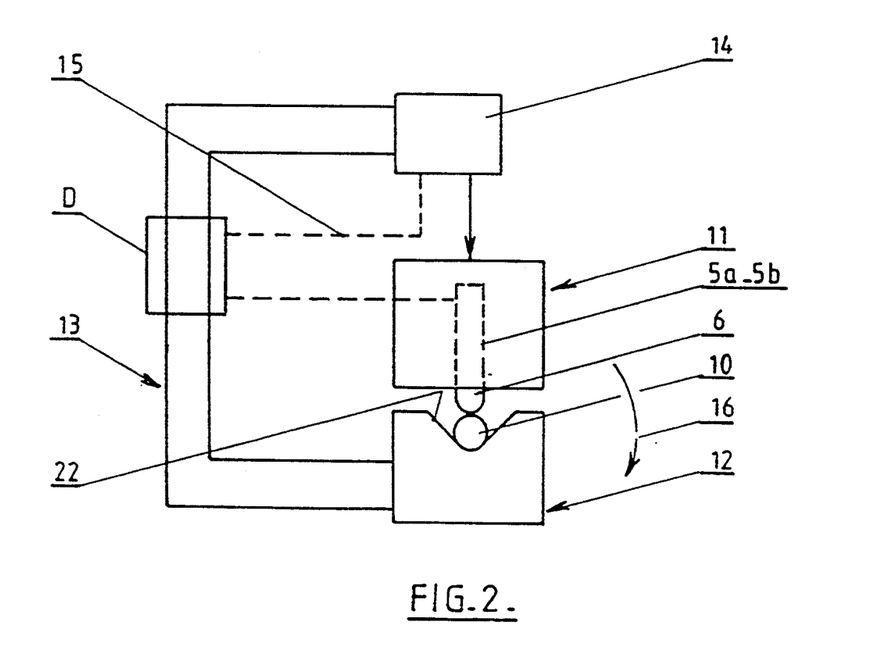
FIG. 2 is a skeleton diagram of an apparatus in accordance with the present invention for stripping shielded cables.
Figure 3:
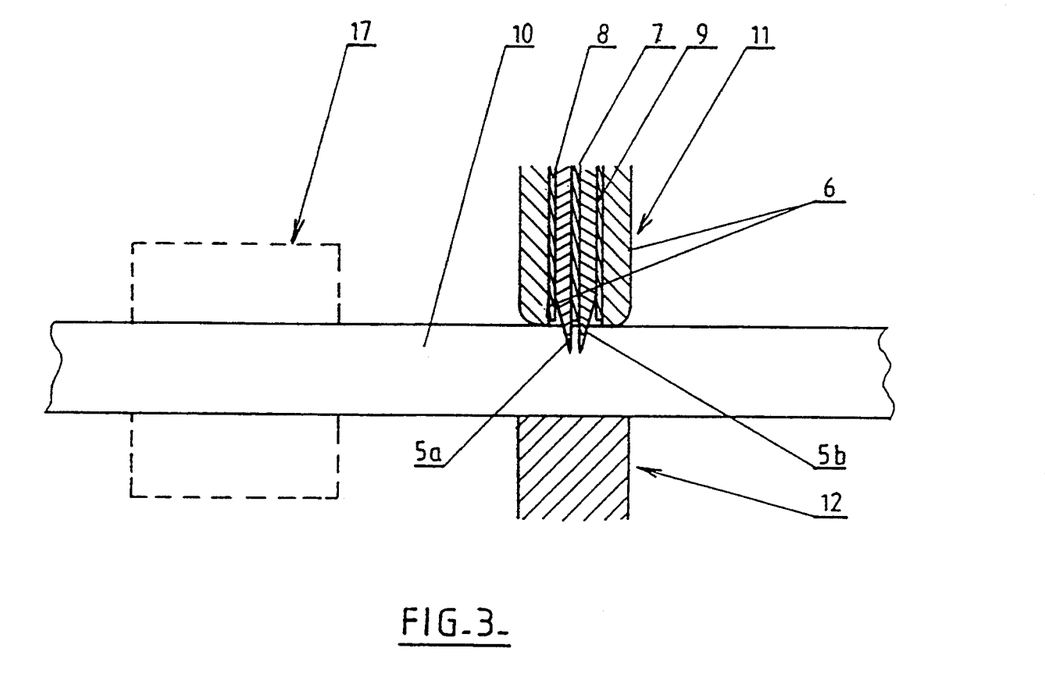
FIG. 3 is a section taken along the axis of the cable of the device in FIG. 2 at cutting means level.

FIGS. 2 and 3 illustrate more precisely the principle of an apparatus according to the invention applying the stripping process described in reference to FIG. 1.

In FIGS. 2 and 3 there is shown a cylindrical cable 10 to be stripped. The stripping apparatus comprises a stripping head 11, a head 12 for holding cable 10. Both heads 11 and 12 are almost diametrically opposed so as to form a pair of jaws able to clamp the cable 10 with a certain amount of adjustable pressure.

To this end, the head 12 is solid with a frame 13 on which the head 11 is mounted. The latter can slide toward the head 12 under the action of a means at 14 forcing the stripping head 12 to press the cable 10 against the holding head 12 under a predetermined adjustable pressure.

The stripping head 11 comprises two blades, a detecting blade 5a and a cutting blade 5b, mounted inside a detector or sensor 6 for adjusting the penetration depth of the blades into the outer sheath of the cable 10 and for tracing the contour of the cable to be stripped.

Both blades 5a, 5b are connected to a detector D comprising means for applying an appropriate potential difference onto both blades 5a, 5b and means for detecting a current conduction generated by a micro-contact between said blades, via the wire conductor of the cable 10. The said detector is held by the frame and equipped with means, either sound and/or light signal, for signaling a micro-contact current conduction and for controlling (through line 15) through the means 14 for applying the pressure so as to release the pressure applied on the cable 10 by the stripping head, and to bring the latter backward.

A relative rotation (arrow 16) between the cable 10 and the assembly 11-15 designed to cut the cable in one or several revolutions is obtained for example by holding the cable 10 close to the cutting area, by a clamping means such as a nozzle or a clamping jaw, 17 in FIG. 3, and by making said assembly 11-15 pivot around the axis of the clamping means 17.

Naturally, the opposite also could be possible, that is making the assembly 11-15 stationary and make the assembly 10,17 rotate around its axis.

The detector 6, the blades 5a, 5b and the holding head 12 are shaped so as to fit exactly the outer profile of the cable 10, said profile being smooth and circular as far as cylindrical cables are concerned, or being uneven with concave and convex parts of different curvatures.

Indeed, the aforesaid stripping method is applied to cylindrical cables, but according to a specific advantage of the invention, it is also applied to cables having any outer profile. The invention applies particularly to stripping twisted cables such as the one illustrated in FIG. 4.

Figures 4, 11:
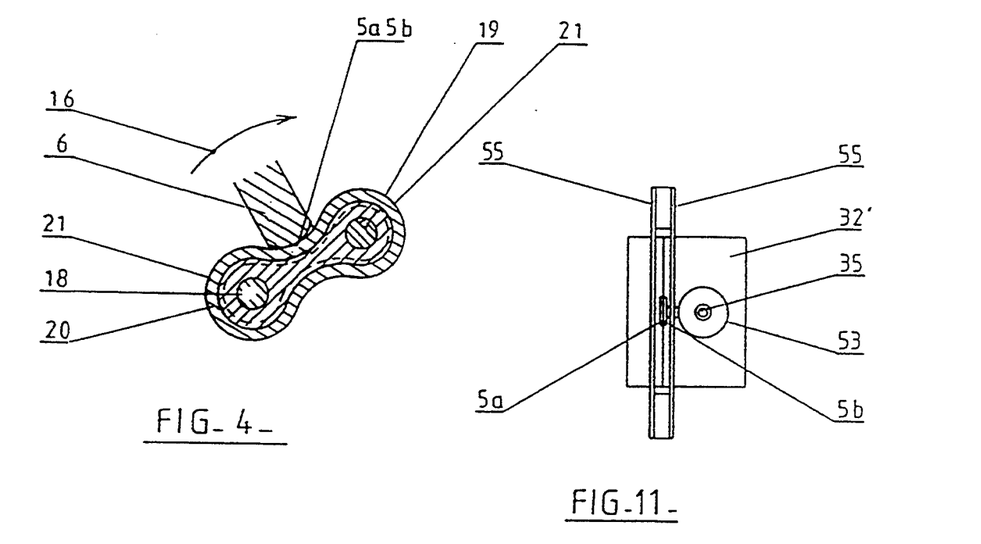
FIG. 4 is a cross-section of a twin wire twisted cable on the sheath of which the cutting device is illustrated in FIGS. 1–3 is applied.
FIG. 11 is a bottom view of the apparatus of FIG. 10.

The cable in FIG. 4 comprises two multiwire conductors 18 and 19 that are twisted and rounded with a common shield 20 consisting for example of a tinned copper braiding, the shield being wrapped in an outer sheath 21 for example made of "Teflon" or of "Kapton".

The outer profile of this cable comprises convex and concave zones.

The cutting section of blades 5a, 5b as well as the extremity of the sensor 6 that is contact with the sheath 21 are shaped so as to fit with said concave zones. To that end, the width of the cutting part of the blades and the profile of the cutting edge are determined so as to have rounded blade extremities according to the minimum curvature radius of the concave zones of the cables outer profiles that are liable to be found.

The active extremity of the sensor 6, and more precisely of both symmetrical parts located on each side of the pair of blades 5a, 5b, shows a profile that is similar to the one of the blades.

The holding head 12 defines a V-shaped cradle 22 for receiving the cable. The profile of the V may vary according to the diameter and the profile of the cable to be stripped. The bottom of the V is shaped so as to enable a correct relative rotation between the head 12 and the cable 10 housed in the bottom of said V-shaped cradle.

The head 12, as well as the stripping head 11, can be movably mounted on the frame 13 toward the cable 10 and synchronous with the head 11.

FIGS. 5-8 illustrate an embodiment of a stripper in accordance with the principle disclosed in FIG. 2 providing a system which simultaneously and in diametrically opposed directions brings forward the stripping 11 and holding 12 heads and applies pressure to both of them.

Figure 5:
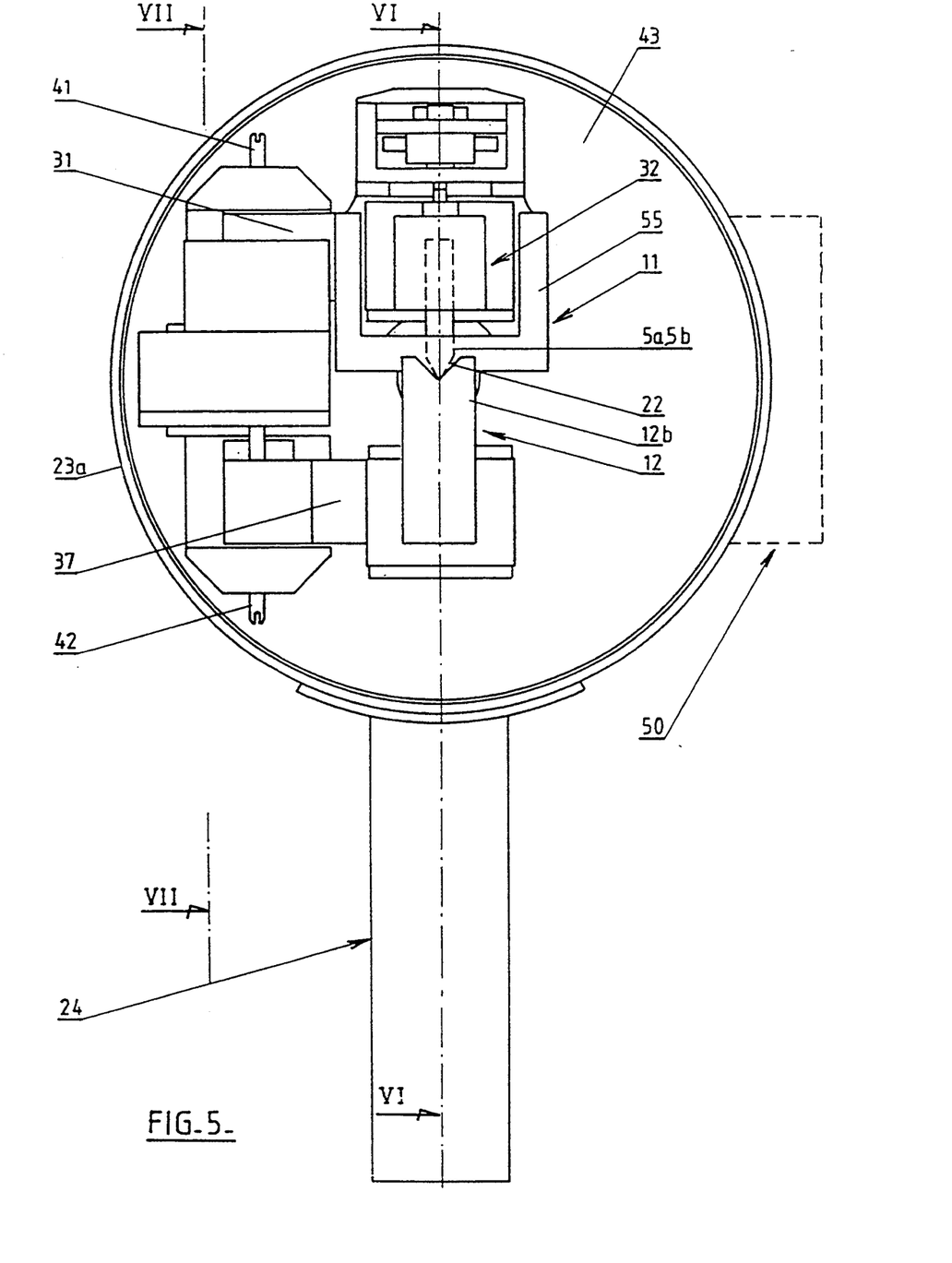
FIG. 5 is a front view of an embodiment of an apparatus for stripping shielded cables in accordance with the invention.
Figure 6:
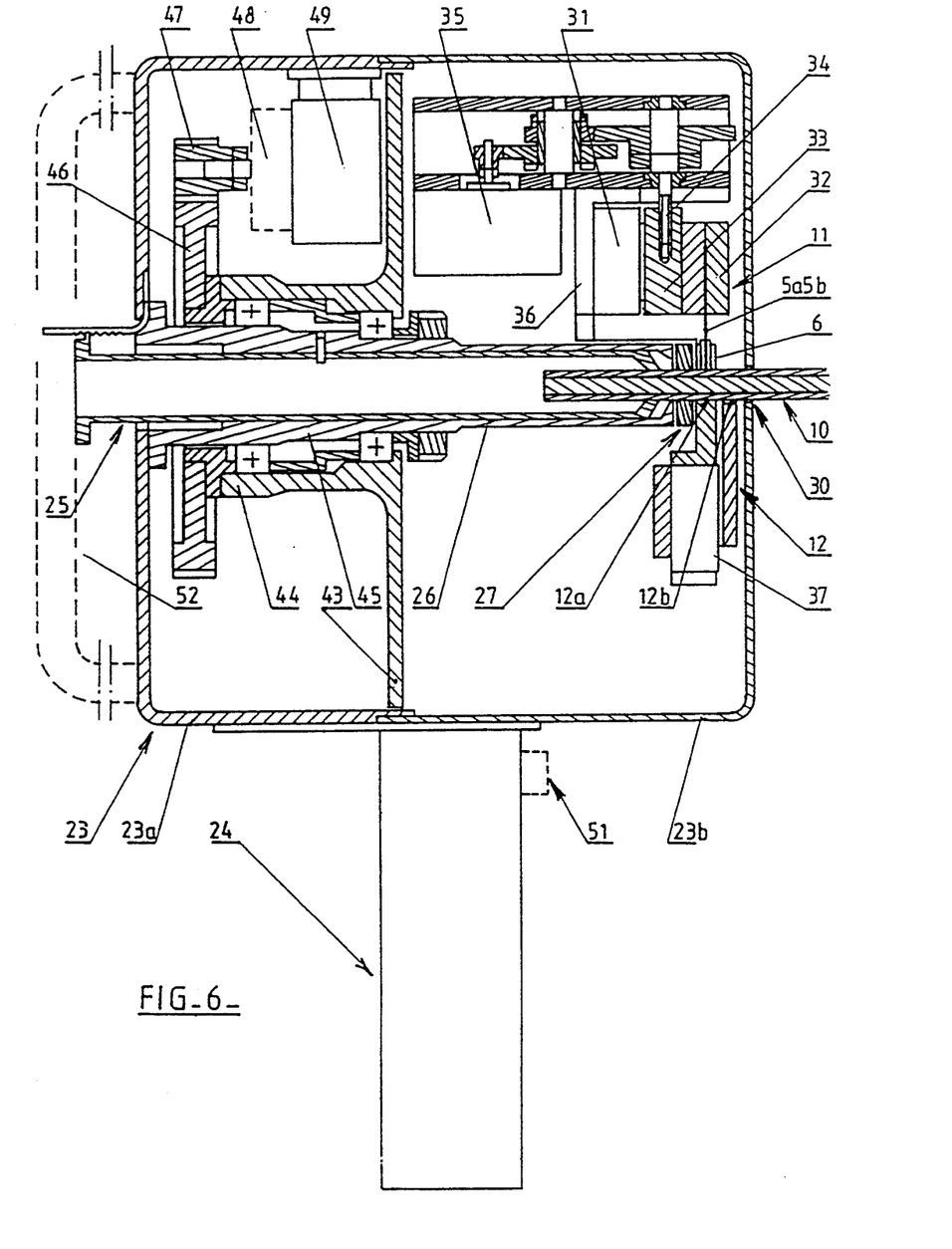
FIG. 6 is a cross-section taken on line VI—VI of the apparatus illustrated in FIG. 5.
Figure 7:
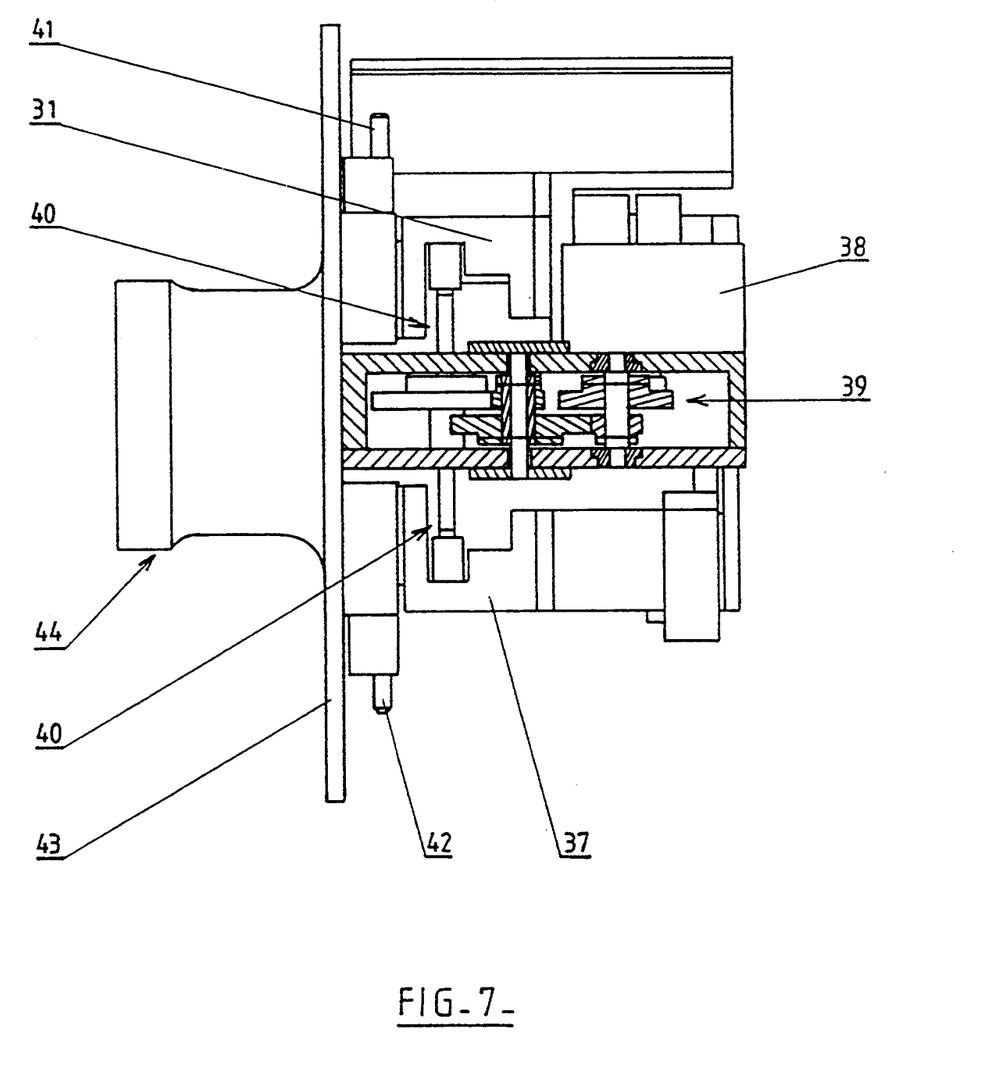
FIG. 7 is a cross-section taken on line VII—VII of the apparatus illustrated in FIG. 5.
Figure 8:
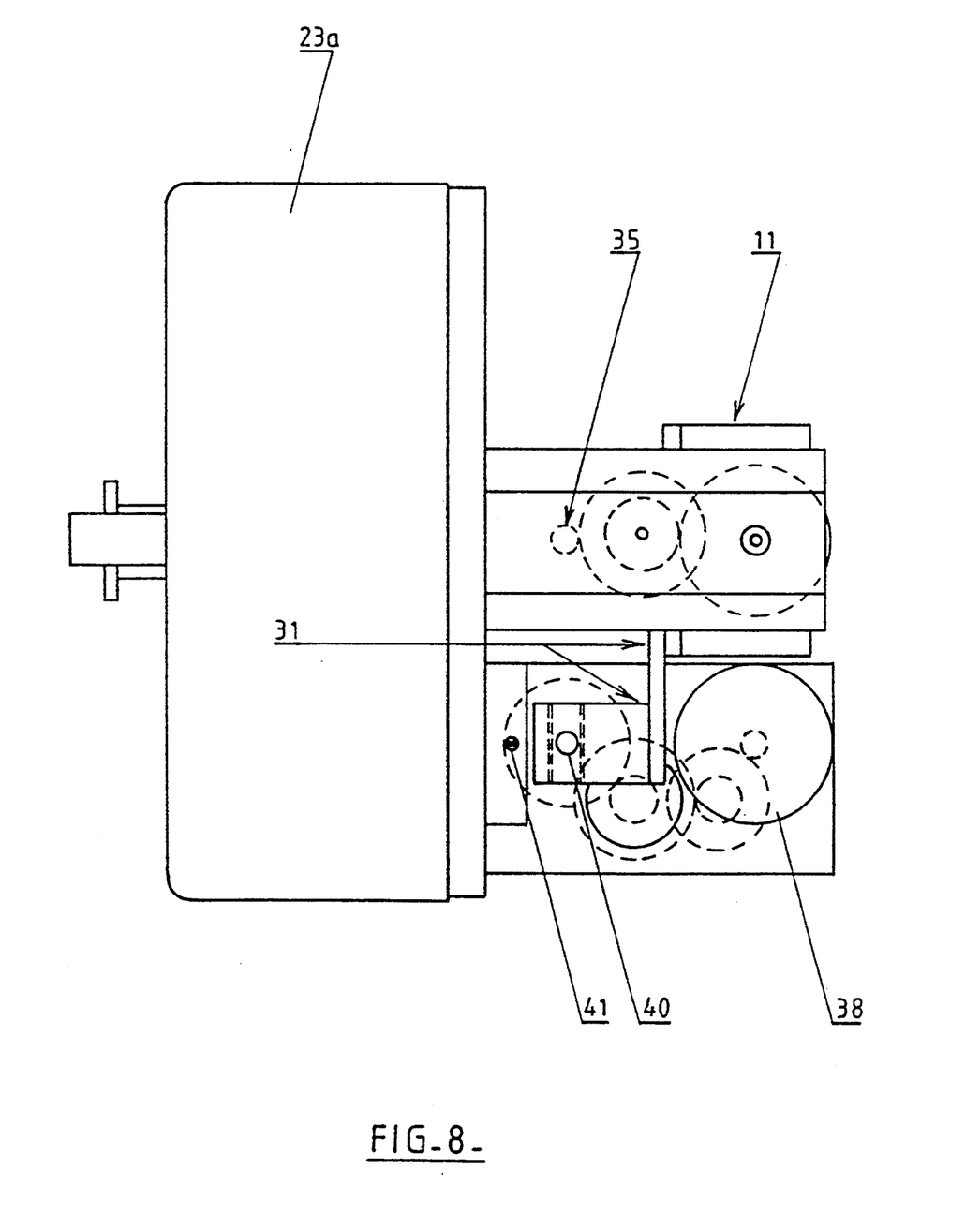
FIG. 8 is a top and left view of the apparatus of FIG. 5.

In FIG. 6, the stripper is shown with a cable 10 engaged between the stripping head 11 and the holding head 12, whereas said cable 10 is not shown in FIGS. 5, 7 and 8.

The apparatus comprises a usually cylindrical case 23 made of two parts 23a and 23b, the latter being removable and having a carrying handle 24. In FIG. 5 the part 23b has been removed.

A tubular bracket is coaxially set inside the case and comprises an inner tube 25 and an outer tube 26 whose ends are equipped with a self-locking centering nozzle 27. The assembly constitutes a cable clamping device enabling locking cables with different diameters according to connectional means The inner tube 25 can axially slide inside the outer tube 26 that is fixedly attached to the case 23a.

The cable to be stripped 10 is engaged in the nozzle 27 through an opening 30 arranged in the planar front side of the removable case 23b.

The nozzle 27 is located at a short distance from the opening 30, and the cable 10 will be stripped inside this gap opposite a section included between the stripping head 11 that bears both blades 5a, 5b and the head 12 that holds the cable.

The holding head 12 comprises a part 12a facing the blades 5a, 5b that is meant to serve as a rest for said blades, and a part 12b slightly off-set toward the opening 30 and provided with a V-shaped housing 22 designed to center the cable.

In FIG. 5 the blades 5a, 5b are abutting against part 12a.

Both parts of the sensor or detector 6 between which the blades 5a and 5b move are fixed to a holding plate 31 whereon a bladeholder 32 is radially sliding so as to adjust the relative position of the blades' extremities relative to detector 6, toward the cable to be stripped.

To that end, said blade-holder 32 is fixed to a part 33 that slides radially on said plate 31 and that is driven by a motor-driven screw 34, said motor 35 fixed to said plate 31 due to a supporting piece 36.

The holding head 12 is fixed to a holding plate 37.

Both plates 31 and 37 are radially movable so as to move off or to draw near to one another, this to and fro motion being simultaneous due to an electric motor 38 (FIG. 5 and 7) that drives the plates 31 and 37 at the same speed through the action of gears 39 and screws 40. In FIG. 5, screws 41 and 42 are shown for the independent adjustment of the radial pressure of the plates 31 and 37 respectively.

The motor 38, plates 31, 37, heads 11 and 12, and motor 35 assembly are mounted on one side of a circular fixing flange 43 that extends on the other side through an axle 44 rotatably mounted on a part 45 of the tube 26 of the center bracket.

The free extremity of the hub 44 is fixed to a toothed wheel 46 engaged with a motor-driven pinion 47 via a reduction gear 48, said motor 49 being attached to the case 23a.

In FIG. 5 a box 50 is shown for driving and adjusting the various motions or functions of the apparatus.

Said box houses more particularly the detector (not shown in FIGS. 5-8) detecting a possible current conduction caused by a micro-contact between the blades 5a, 5b, the on-off control of the motors 35 and 38, computerized means for adjusting the various parameters (depending on the type of cable to be stripped), namely the positioning of the blades 5a, 5b in relation to the sensor 6 (maximum depth of cutting), the pressure to be applied on the cable via the heads 11 and 12 during the stripping operation, the rotational speed (motor 49) of the assembly 11-12 around the cable 10, and the number of complete revolutions of such assembly, and means for the automatic control of the stripping process once the various parameters are displayed.

Such computerized means are conventional means and comprise a programmable microprocessor, input-output units, displaying and signalling units. They are connected to the various units controlled or checked by links that are not shown on the drawings, and they are also connected to a source of electric power that can be one or several batteries (not shown here) supplying also motors 35, 38 and 49.

The box 50 is arranged on the most appropriate location on the case stationary part 23a which can be shaped for this purpose.

It should be noted that the case 50 as well as the source(s) of electric power could be installed far from the stripper and connected to the latter via a flexible lead.

The carrying handle 24 can be equipped with a control button (as shown at 51 on FIG. 6) for starting the motor 49 that rotates the assembly 11-12 and for stopping the latter when the stop has not been programmed.

A subsidiary handle such as the one represented at 52 in FIG. 6 can be provided for at the rear part of the apparatus.

FIGS. 12a-12e illustrate the various relative positions of the blades 5a, 5b, of the sensor 6 and of the cable 10 to be stripped.

Figure 12A:
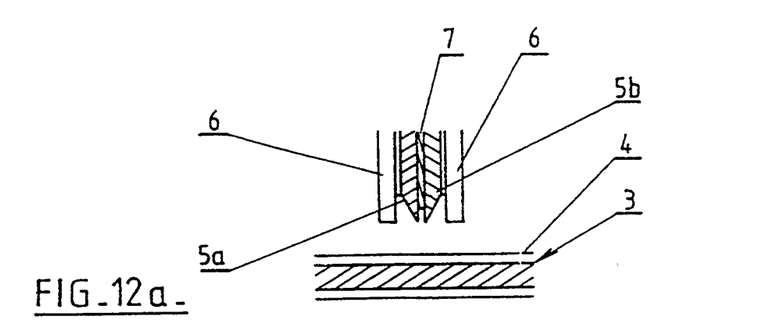
FIG. 12a–12e illustrate various positions of the detector-blades/blade-holder assembly in relation to the cable to be stripped.

FIG. 12a illustrates the resting position of both the sensor 6 when it is at the maximum distance from the cable that is in the stripping position in the nozzle 29 (not shown), and the blades 5a, 5b when they are completely engaged in the sensor 6.

Figure 12B:
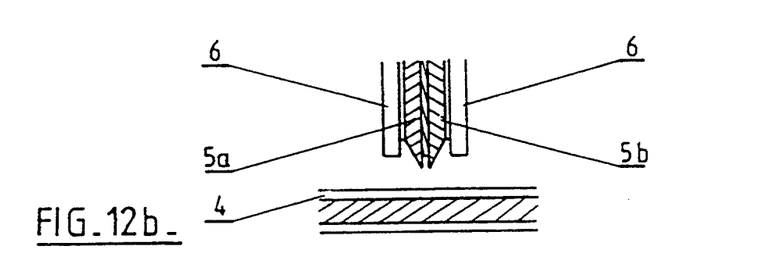

FIG. 12b illustrates the blades 5a, 5b when 85 micrometers of their length, for example, come out of the sensor 6, such length representing the penetration depth of the blades into the outer sheath 4 of the cable. The adjustment of this depth is carried out thanks to the motor 35.

Figure 12C:
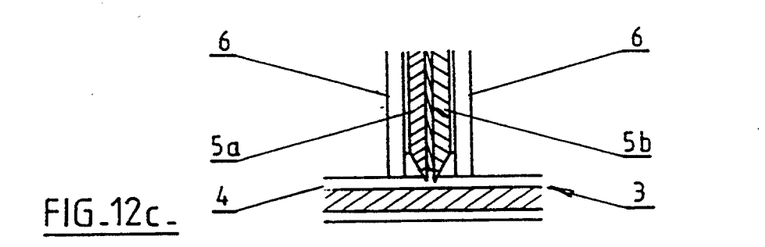

FIG. 12c illustrates the sensor 6 when resting on the cable 10, and the blades 5a, 5b once they have penetrated into the outer sheath 4 by for example 85 micrometers. Said cutting position is obtained due to the motor 38. The pressure applied on the cable 10 by both the sensor 6 and the holding head 12 can be adjusted and maintained constant while the assembly 11-12 is rotating around the cable, whatever the outer profile of the latter may be.

As regards the cable of FIG. 4, this is how the heads 11 and 12 will draw nearer to one another when the sensor 6 will fit the concave zones of the cable outer profile while the heads are rotating, and on the contrary, they will part when they reach the convex zones while maintaining the same pressure on the cable.

Figure 12D:
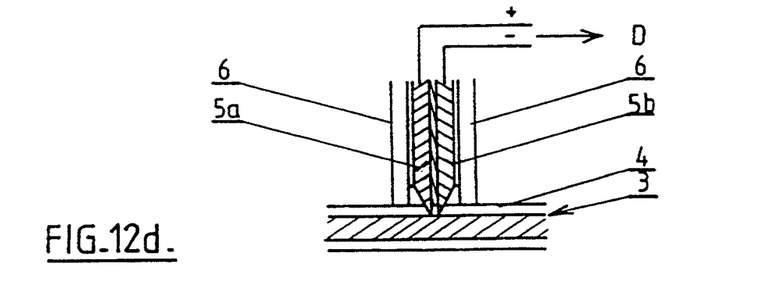

FIG. 12d illustrates a defect position wherein the blades 5a, 5b travel through the whole thickness of the sheath 4, for example owing to the display of a penetration depth that is too high or to a localized thinning of the outer sheath, and come into contact with the electric-conducting shield 3 that immediately creates a current conduction through a micro-contact between both blades. The detection of the micro-contact current conduction causes the automatic and instantaneous withdrawal of the heads 11 and 12 thanks to the detector D that is incorporated into the controlling and checking case 50 and that acts upon the motor 38.

Figure 12E:
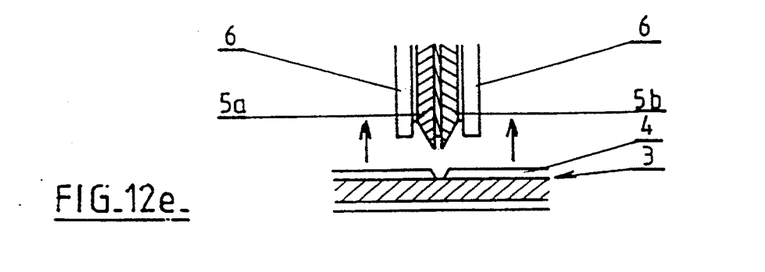

FIG. 12e illustrates such withdrawal together with the automatic repositioning of the devices 5a, 5b, 6 in the resting position of FIG. 12a.

In general, in a defect configuration such as the one illustrated in FIG. 12d, the superficial oxidation of the metal shielding 3 is enough to create a micro-contact between the blades 5a, 5b that can be detected by the current conduction detector D connected to the blades.

Anyhow, whether the shielding is superficially oxidized or not, since the detector D is sensible and reacts to a mere micro-contact, the possible physical contact between the blades 5a, 5b and the shielding 3 is so light and stealthy that there is no consequence at all on the shield surface integrity.

Once a stripping defect has been detected, a single adjustment of the blades 5a, 5b penetration depth to a lower value will eliminate any new stripping defect for the same type of cable.

The apparatus according to the invention can therefore guarantee that no badly stripped cables will be wasted and also that the speed rate of stripping will be much higher than the rate reached with known stripping techniques, and with an almost unlimited range of cable types.

Preferably, the blades 5a, 5b are ground on one side only, the cutting edge being on the inner side so that both cutting marks that are separated by approximately one tenth of a mm for example, almost blend.

Furthermore, it is not necessary that the outer sheath 4 of the cable be cut on the whole thickness in order to be removed, which enables to display a penetration depth of the blades 5a, 5b which avoid any contact of the latter with the subjacent shield.

The outer sheath is advantageously cut by progressively approaching within a maximum of three revolutions for example.

Figures 9, 10:
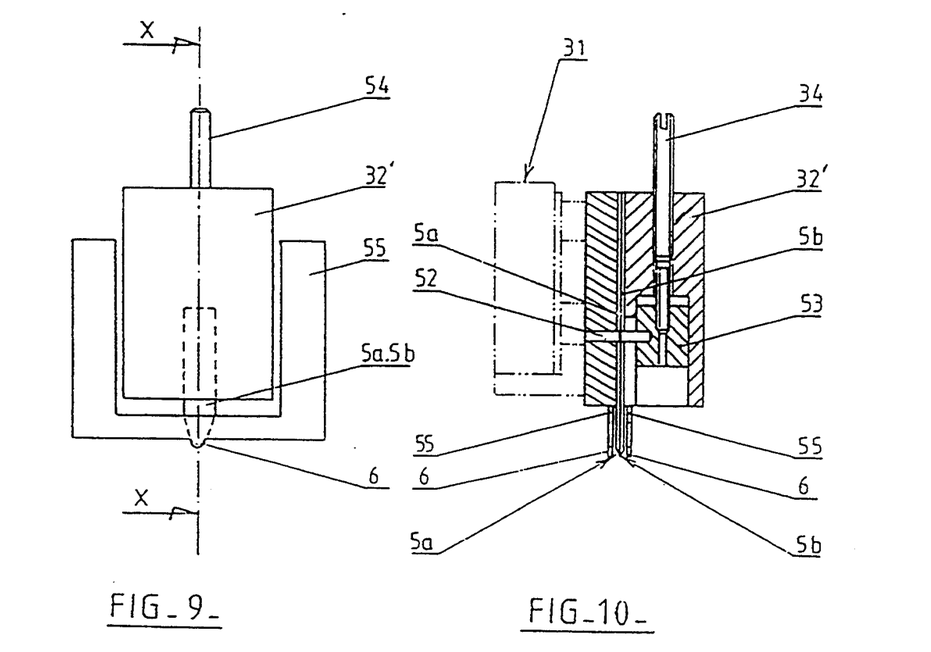
FIG. 9 is a front view of the detector-blades/blade-holder assembly of the apparatus of FIG. 5.
FIG. 10 is a cross-section taken on line X—X of the apparatus of FIG. 9.

Both blades of the blade-holder 32 are stationary, or according to a variant illustrated in FIGS. 9-11, the detecting blade (5a) is stationary on the blade-holding unit of the blade-holder ( 32') , whereas the cutting blade (5b) slides at right angles with the cable to be stripped, due to a pin 52 that is fixed to a sliding piece 53 activated by a hand driven screw 54.

Such screw 54 permits adjustment of the cutting edges of blades 5a, 5b at the same level, this operation being necessary in order to avoid any contact with the subjacent shield.

The detection of a micro-contact between the blades 5a, 5b depending directly on the gap cumulated between the subjacent shield and one of the blades (5a, 5b) on the one hand, and between the shield and the other blade on the other hand, if both blades are not level, the detection of a micro-contact may occur when the foremost blade is too far ahead and thereby alters the shield.

In FIGS. 5, 6 and 9-11 there is shown at 55 two U-shaped parts attached while being at a distance from one another and forming the sensor 6 units through two opposite projections. Parts 55 are fixed to the plate 31.

The blade-holder 32 in FIGS. 5 and 6 is removable and can be replaced by the blade-holder 32' or any other blade-holder of different shape and dimensions.

The blades 5a, 5b can be replaced by any element which is stationary of movable in relation to the sensor 6 and that is liable to create a partial or total interruption of continuity in the outer sheath of the cable to be stripped through cutting, nicking with or without removal of the material, melting out of material, whatever the technique used.

The above described apparatus can be used for making windows on a cable, that is to say for removing a section of the outer sheath other than the extremities of the cable.

As it has already been said above, the invention applies more particularly to stripping shielded and sheathed cables, or wire conductors of any shape, but also can apply to cutting, according to the meaning defined at the beginning of the present description, an insulating sheet element covering an electric-conducting surface and sticking to the latter, in order to strip such surface through removing, peeling or other the cut made in said covering element.

The invention is obviously not limited to the embodiments represented and described herein but covers all the possible variations particularly concerning the nature, shape and dimensions of the detecting and cutting (5a, 5b) devices or similar, of the sensing unit 6 and the holding means (head 12) that cooperate with the cutting devices.

Finally, the invention applies to cutting a sheet element, a sheath or similar, made of any material, as far as it is not an electric-conducting element, in order to strip the subjacent surface made of any material as far as it is electric-conducting.

Furthermore, the electric motors 35, 38 and 49 can be replaced by any driving means of various techniques.

What is claimed is:

1. A stripper for parts of electrically conductive material with a protective covering, comprising:
   a cutting device of electrically conductive material;
   a detecting device of electrically conductive material placed side-by-side with and at short distance from said cutting device, said detecting device being configured as a cutting instrument;
   device support means, coupled to said cutting device and said detecting device, for electrically insulating said cutting device from said detecting device and for maintaining said devices in relatively fixed and parallel positions;
   operating means, coupled to said cutting device and said detecting device, for moving said devices as a unit relative to the protective covering simultaneously and in parallel; and
   detecting means, coupled to said cutting device and said detecting device, for applying a potential difference to said devices and for detecting a current generated by a micro-contact electrically coupling said devices.

2. A stripper according to claim 1 wherein said operating means comprises pressure means for applying said devices on the protective covering with a predetermined and adjustable pressure.

3. A stripper according to claim 2 wherein said pressure means comprises relief means for reducing the pressure applied by said pressure means on said devices when said detecting means detects a current conducted by a micro-contact between said cutting device and said detecting device.

4. A stripper according to claim 1 wherein cable support means, for holding cable to be stripped between said device support means and said cable support means, faces said cutting device and said detecting device;

a frame supports said cable support means and said device support means for sliding movement of at least one of said support means toward the other of said support means;

said operating means comprises pressure means, coupled to one of said support means, for applying a constant and adjustable force on the respective support means toward the other support means; and said operating means comprises rotation means for performing a rotation through at least one revolution of the cable relative to said device support means and said cable support means.

5. A stripper according to claim 4 wherein a sensor is adjustably coupled to said cutting device and said detecting device, said sensor having cable contacting means, contoured to the cable to be stripped, for engaging the cable, for adjustably limiting penetration depth of said devices into the protective covering and for guiding said devices during rotation about the cable.

6. A stripper according to claim 4 wherein said pressure means is connected to said detecting means for reducing the force applied by said pressure means when a current is conducted between said devices by a micro-contact.

7. A stripper according to claim 4 wherein said pressure means is connected to said detecting means for stopping stripping of the cable and for controlling removal of said detecting device and said cutting device away from the cable as soon as said detecting means detects a current conducted between said devices by a micro-contact.

8. A stripper according to claim 4 wherein said cutting device and said detecting device comprise thin blades having rounded and parallel cutting edges.

9. A stripper according to claim 8 wherein a sensor is adjustably coupled to said cutting device and said detecting device, said sensor having cable contacting means, contoured to the cable to be stripped, for engaging the cable, for adjustably limiting penetration depth of said devices into the protective covering and for guiding said devices during rotation about the cable.

10. A stripper according to claim 9 wherein said sensor comprises two parts shaped similarly to active extremities of said cutting device and said detecting device and placed on opposite sides of said devices.

11. A stripper according to claim 4 wherein said cutting device and said detecting device are mounted on a removable holder such that one of said devices is stationary and the other of said devices is movable toward the cable to be stripped.

12. A stripper according to claim 4 wherein
said device support means and said cable support means are mounted for rotation about a cable axis; and stop means are coupled to said support means for immobilizing the cable to be stripped.

13. A stripper according to claim 12 wherein
said stop means is attached to a portable frame;

said device supporting means and said cable support means are fixedly attached to a hub mounted for rotation coaxially of said stop means; and a motor, fixed to said frame, rotationally drives said hub.

14. A device according to claim 4 wherein said cable support means comprises a first part facing said cutting device and said detecting device, and a second part axially movable relative to the cable with a V-shaped housing for receiving the cable.

15. A stripper according to claims 4 wherein programmable microprocessor means, for controlling and checking various movable elements, is connected to said detecting means, said microprocessor means automatizing stripping processes dependent upon various parameters displayed, including penetration depth of said cutting and detecting devices, pressure applied to the cable by said device and cable support means, speed of relative rotation between the cable and said device and cable support means, and number of revolutions, reducing pressure and moving the cable away from said cutting and detecting devices, and stopping operation when a current conduction generated by a micro-contact between said detecting and cutting devices is detected by said detecting means.

16. A stripper for parts of electrically conductive material with a protective covering, comprising:
a cutting device of electrically conductive material;

a detecting device of electrically conductive material placed side-by-side with and at short distance from said cutting device, said detecting device being configured as a cutting instrument and being electrically insulated from said cutting device;

operating means, coupled to said cutting device and said detecting device, for simultaneously applying and moving said devices on the protective covering;

detecting means, coupled to said cutting device and said detecting device, for applying a potential difference to said devices and for detecting a current generated by a micro-contact electrically coupling said devices;

device support means for holding said cutting device and said detecting device;

cable support means for holding cable to be stripped between said device support means and said cable support means, said cable support means facing said cutting device and said detecting device;

a frame supporting said cable support means and said device support means for sliding movement of at least one of said support means toward the other of said support means;

pressure means, incorporated in said operating means and coupled to one of said support means, for applying a constant and adjustable force on the respective support means toward the other support means; and rotation means, incorporated in said operating means, for performing a rotation through at least one revolution of the cable relative to said device support means and said cable support means.

17. A stripper according to claim 16 wherein a sensor is adjustably coupled to said cutting device and said detecting device, said sensor having cable contacting means, contoured to the cable to be stripped, for engaging the cable, for adjustably limiting penetration depth of said devices into the protective covering and for guiding said devices during rotation about the cable.

18. A stripper according to claim 16 wherein said pressure means is connected to said detecting means for reducing the force applied by said pressure means when a current is conducted between said devices by a micro-contact.

19. A stripper according to claim 16 wherein said pressure means is connected to said detecting means for stopping stripping of the cable and for controlling removal of said detecting device and said cutting device away from the cable as soon as said detecting means detects a current conducted between said devices by a micro-contact.

20. A stripper according to claims 16 wherein programmable microprocessor means, for controlling and checking various movable elements, is connected to said detecting means, said microprocessor means automatizing stripping processes dependent upon various parameters displayed, including penetration depth of said cutting and detecting devices, pressure applied to the cable by said device and cable support means, speed of relative rotation between the cable and said device and cable support means, and number of revolutions, reducing pressure and moving the cable away from said cutting and detecting devices, and stopping operation when a current conduction generated by a micro-contact between said detecting and cutting devices is detected by said detecting means.

* * * * *

UNITED STATES PATENT AND TRADEMARK OFFICE
CERTIFICATE OF CORRECTION

PATENT NO. : 5,361,653
DATED : November 8, 1994
INVENTOR(S) : Louis Pradin It is certified that error appears in the above-identified patent and that said Letters Patent is hereby corrected as shown below:

On the title page,

"[73] Assignee: Societe Nationale Industrielle et Aerospatiale, Paris, France"

should read

-- [73] Assignee: Societe Anonyme dite Aerospatiale Societe Nationale Industrielle, Paris, France --.

Signed and Sealed this

Twenty-seventh Day of December, 1994

*Attest:*

BRUCE LEHMAN

*Attesting Officer*     *Commissioner of Patents and Trademarks*